(12) United States Patent
Yoshida et al.

(10) Patent No.: US 9,555,837 B2
(45) Date of Patent: Jan. 31, 2017

(54) VEHICLE HOOD STRUCTURE

(71) Applicant: Kobe Steel, Ltd., Kobe-shi (JP)

(72) Inventors: Masatoshi Yoshida, Kobe (JP); Hiroko Kashima, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/071,871

(22) Filed: Mar. 16, 2016

(65) Prior Publication Data

US 2016/0280279 A1    Sep. 29, 2016

(30) Foreign Application Priority Data

Mar. 27, 2015 (JP) .................... 2015-067003

(51) Int. Cl.
*B62D 25/00* (2006.01)
*B62D 25/12* (2006.01)

(52) U.S. Cl.
CPC .................... *B62D 25/12* (2013.01)

(58) Field of Classification Search
CPC ........ B62D 25/10; B62D 25/105; B62D 25/12
USPC .................... 296/193.11; 180/69.2
See application file for complete search history.

(56) References Cited

U.S. PATENT DOCUMENTS

| | | | | |
|---|---|---|---|---|
| 5,024,383 A * | 6/1991 | Vaschetto | .............. | B60S 1/50 239/284.1 |
| 2004/0021342 A1 | 2/2004 | Fujimoto | | |
| 2008/0007094 A1 | 1/2008 | Ishitobi | | |
| 2010/0314907 A1 | 12/2010 | Iwano et al. | | |
| 2013/0181484 A1 * | 7/2013 | Grattan | ............... | B62D 25/105 296/193.11 |

FOREIGN PATENT DOCUMENTS

| | | |
|---|---|---|
| JP | 2005-75163 | 3/2005 |
| JP | 3674918 | 7/2005 |
| JP | 2005-239092 | 9/2005 |
| JP | 2006-44311 | 2/2006 |
| JP | 4014144 | 11/2007 |
| JP | 2008-24186 | 2/2008 |
| JP | 2008-24193 | 2/2008 |
| JP | 4287614 | 7/2009 |
| JP | 4293152 | 7/2009 |
| JP | 4297076 | 7/2009 |
| JP | 4407755 | 2/2010 |
| JP | 2010-116074 | 5/2010 |
| JP | 4479581 | 6/2010 |
| JP | 4492431 | 6/2010 |
| JP | 4664874 | 4/2011 |

* cited by examiner

*Primary Examiner* — Joseph D Pape
(74) *Attorney, Agent, or Firm* — Oblon, McClelland, Maier & Neustadt, L.L.P.

(57) ABSTRACT

A vehicle hood structure includes a hood outer panel and a hood inner panel. The hood outer panel includes at least one character line extending substantially in a vehicle front-rear direction. The character line intersects a central line that extends in a vehicle width direction and that passes through a central point where a center of the hood outer panel in the vehicle front-rear direction and a center of the hood outer panel in the vehicle width direction are superposed on each other. The character line intersects the central line at an intersection point positioned within a region extending from the central point by 300 mm or less in the vehicle width direction.

4 Claims, 10 Drawing Sheets

VEHICLE HOOD STRUCTURE

BACKGROUND OF THE INVENTION

1. Field of the Invention

The present invention relates to a vehicle hood structure that includes a hood inner panel and a hood outer panel and that has good pedestrian protection performance when a vehicle collides with a pedestrian and good front collision performance when the vehicle collides with another vehicle.

2. Description of the Related Art

There are many design requirements to be satisfied other than pedestrian protection performance for a vehicle hood structure including a hood inner panel and a hood outer panel. In particular, when a front collision with another vehicle occurs, it is required that the vehicle hood structure be deformed such that the center of the vehicle hood structure rises and is bent into an angular shape in sectional view so as to prevent entrance into the vehicle. In order to facilitate this bending deformation, a structure that includes a crush bead extending in the vehicle width direction has been proposed (see, for example, Japanese Unexamined Patent Application Publication No. 2005-75163, Japanese Patent No. 4407755, and Japanese Unexamined Patent Application Publication No. 2005-239092). Furthermore, according to these patent documents, the crush bead is applied to the hood inner panel provided with hat-shaped beads extending in the vehicle front-rear direction.

Figure 7A:
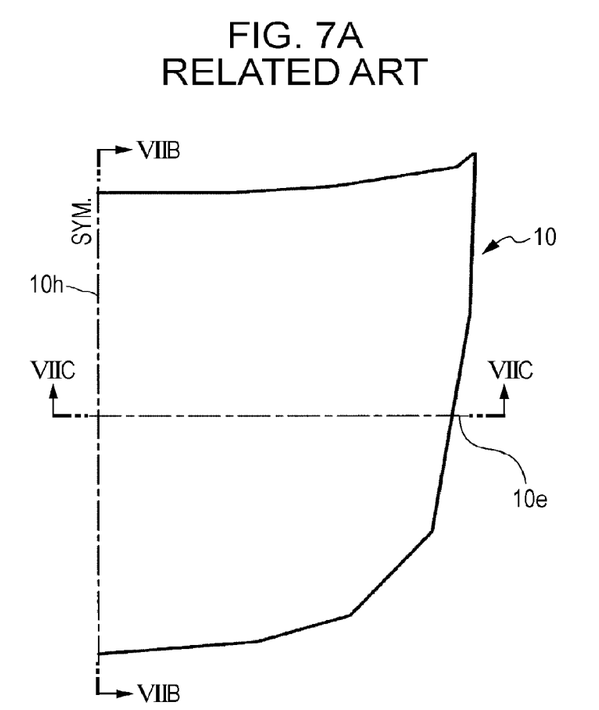
FIG. 7A is a plan view of the vehicle hood structure.
Figure 7B:
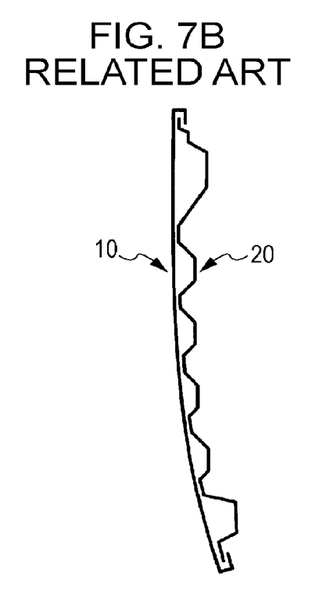
FIG. 7B is a sectional view of the vehicle hood structure illustrated in FIG. 7A taken along line VIIB-VIIB illustrated in FIG. 7A.
Figure 7C:
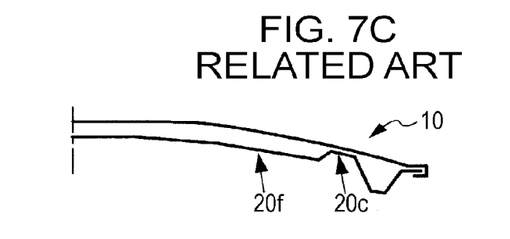
FIG. 7C is a sectional view of the vehicle hood structure illustrated in FIG. 7A taken along line VIIC-VIIC illustrated in FIG. 7A.
Figure 8:
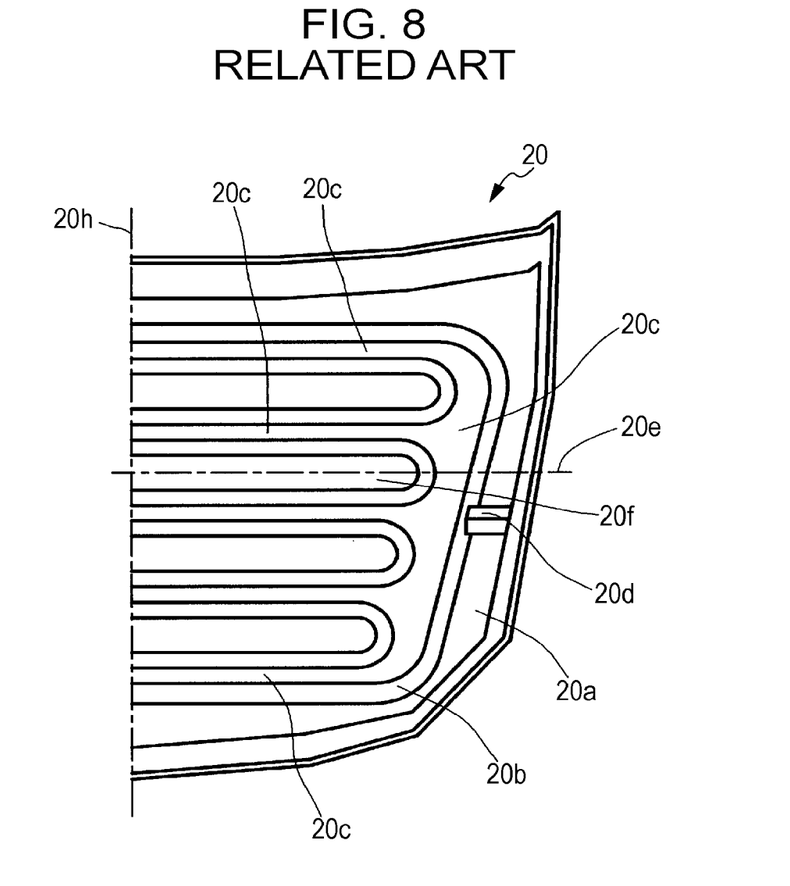
FIG. 8 is a schematic perspective view of a hood inner panel of the vehicle hood structure illustrated in FIG. 7A (with a hood outer panel removed)

Furthermore, in order to obtain both the front collision performance and the pedestrian protection performance, some vehicle hood structures (see FIGS. 7A to 7C) have been proposed which include a hood outer panel 10 and a hood inner panel 20 that includes a crush bead 20d and a plurality of substantially hat-shaped beads 20f extending in the vehicle width direction as illustrated in FIG. 8 (for example, see Japanese Unexamined Patent Application Publication No. 2006-44311).

SUMMARY OF THE INVENTION

However, there is a problem with the technique disclosed in Japanese Unexamined Patent Application Publication No. 2005-75163, Japanese Patent No. 4407755, and Japanese Unexamined Patent Application Publication No. 2005-239092 in that deformation stiffness of the beads in the vehicle front-rear direction against a front collision load is high, and accordingly, the vehicle hood structure is not easily bent. In order to address this, the height of the crush bead is increased to some degree. However, when the vehicle collides with the head of the pedestrian, the bending deformation occurs more easily than required from this crush bead as a starting point, and accordingly, the acceleration after the first peak is rapidly reduced. This causes another problem in that the amount of absorption of collision energy is reduced, and accordingly, the HIC value is degraded.

Figure 9:
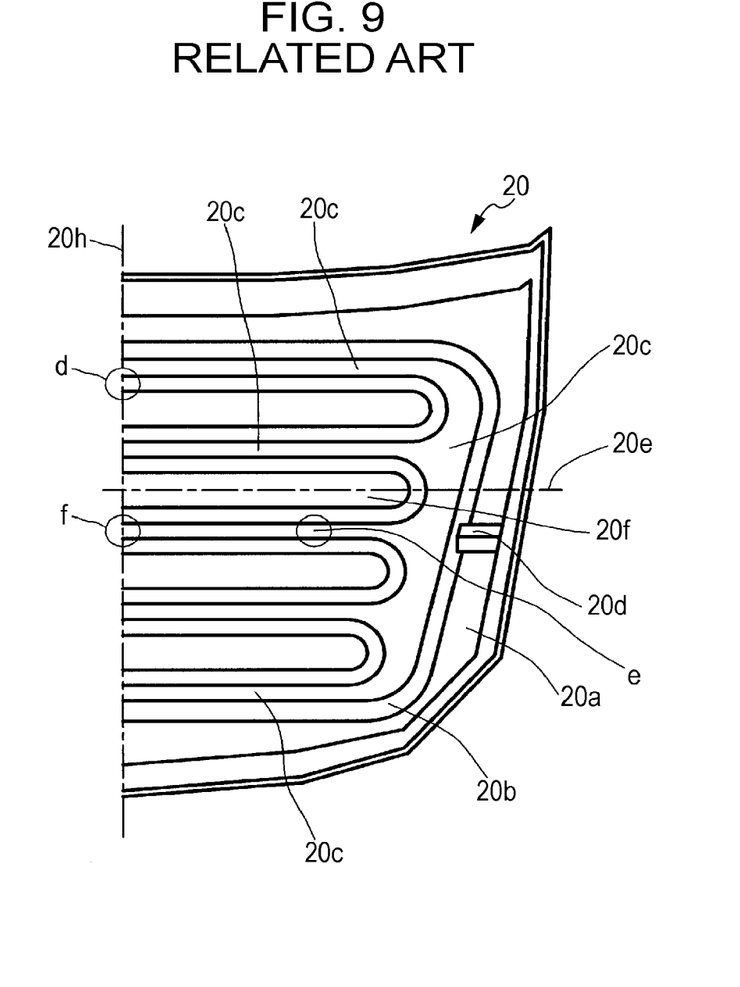
FIG. 9 is an explanatory view of three impact points where impact is applied to the vehicle hood structure, the impact points being indicated on the hood inner panel illustrated in FIG. 8.
Figure 10:
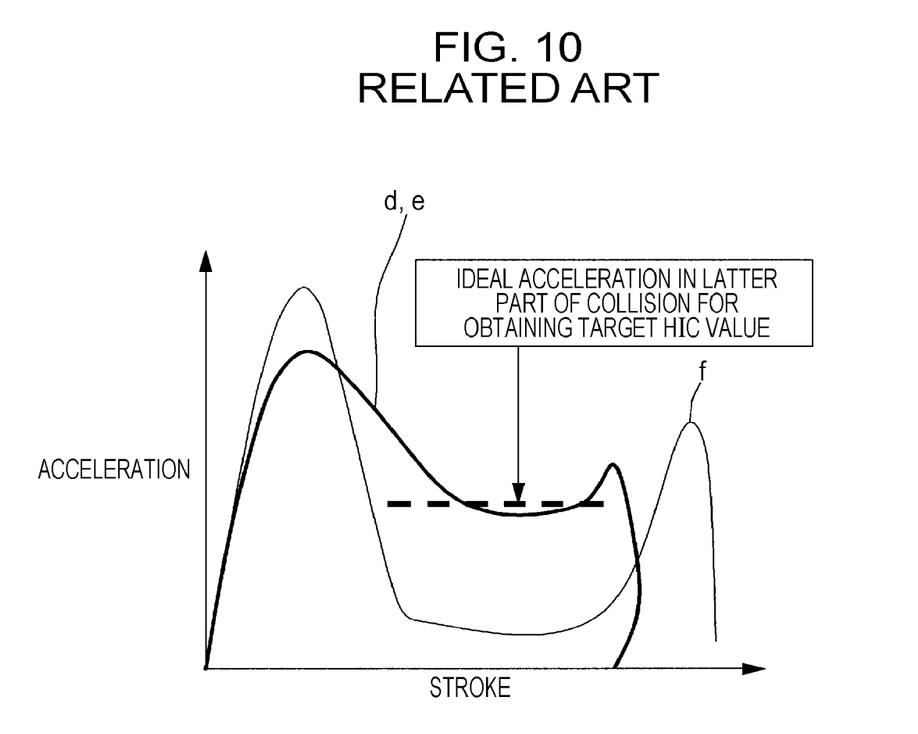
FIG. 10 is a waveform chart illustrating the relationship between a stroke and acceleration at three impact points illustrated in FIG. 9.

According to the technique disclosed in Japanese Unexamined Patent Application Publication No. 2006-44311, the beads 20f extend in the vehicle width direction of the hood inner panel 20 as illustrated in FIG. 8. Thus, the vehicle hood structure is likely to undergo bending deformation. This is certainly preferable. However, when the head of the pedestrian collides with a portion such as a portion near a central portion of the hood inner panel 20 (for example, a portion marked by "f" of FIG. 9), reduction of the acceleration after the first peak becomes significant. As a result, a stroke is enlarged and the second acceleration peak is increased. This causes a problem in that the target HIC value is largely degraded compared to a satisfactory HIC value. When such reduction of the acceleration occurs, the amount of absorption of the collision energy is reduced, and accordingly, a collision stroke is increased and the likelihood of the hood being brought into contact with under-hood components such as an engine is increased. Thus, there is a problem in that the second acceleration peak caused by this contact is increased (see FIG. 10). This in turn causes a problem in that the increase in the second acceleration peak leads to degradation of the HIC (head injury criterion) value and degradation of the pedestrian protection performance.

Accordingly, an object of the present invention is to provide a vehicle hood structure with which a vehicle hood stably undergoes bending deformation when a front collision with a vehicle occurs, and pedestrian protection performance can be further improved.

In order to achieve the above-described object, a vehicle hood structure according to a first aspect of the present invention includes a hood inner panel and a hood outer panel. In the vehicle hood structure, the hood inner panel includes a substantially annular outer proximal surface coupled to a central region of the hood outer panel which is a region of the hood outer panel other than an outer peripheral portion of the hood outer panel, and a plurality of beads that are disposed on an inner peripheral side of the substantially annular outer proximal surface, that extend in a vehicle width direction, that are substantially parallel to one another, and that project from the outer proximal surface to a lower side of a vehicle. The hood outer panel includes at least one character line that extends substantially in a vehicle front-rear direction. The character line intersects a central line that extends in the vehicle width direction and that passes through a central point where a center of the hood outer panel in the vehicle front-rear direction and a center of the hood outer panel in the vehicle width direction are superposed on each other. The character line intersects the central line at an intersection point positioned within a region extending from the central point by 300 mm or less in the vehicle width direction.

The vehicle hood structure according to a second aspect of the present invention, in the vehicle hood structure of the first aspect, the at least one character line preferably include a plurality of character lines. In this case, the plurality of character lines are provided in a left and right sides of the central point in the vehicle width direction so as to be symmetric about the central point and are substantially parallel to the vehicle front-rear direction.

The vehicle hood structure according to a third aspect of the present invention, in the vehicle hood structure of the first aspect or the second aspect, in a section of the hood outer panel taken along the central line, a radius of curvature of a top portion of the at least one character line or each of the plurality of character lines projecting to an upper side of the vehicle is preferably from 5 to 20 mm.

As described above, according to the present invention, the vehicle hood structure includes the hood inner panel and the hood outer panel. In the vehicle hood structure, the hood inner panel includes the substantially annular outer proximal surface coupled to the central region of the hood outer panel which is the region of the hood outer panel other than the outer peripheral portion of the hood outer panel. The hood inner panel also includes the plurality of beads that are disposed on the inner peripheral side of the substantially annular outer proximal surface, that extend in the vehicle width direction, that are substantially parallel to one another, and that project from the outer proximal surface to the lower side of the vehicle. The hood outer panel includes the at least one character line that extends substantially in the vehicle front-rear direction. The character line intersects the central line that extends in the vehicle width direction and that passes through the central point where the center of the hood outer panel in the vehicle front-rear direction and the center of the hood outer panel in the vehicle width direction are superposed on each other. The character line intersects the central line at the intersection point positioned within the region extending from the central point by 300 mm or less in the vehicle width direction. Accordingly, a vehicle hood structure can be realized with which a vehicle hood stably undergoes bending deformation when a front collision with a vehicle occurs and pedestrian protection performance can be further improved.

The hood inner panel according to the structure of the present invention includes the plurality of beads that extend in the vehicle width direction, that are substantially parallel to one another, and that project from the outer proximal surface to the lower side of the vehicle. Thus, the hood inner panel allows stress to propagate therethrough in the vehicle width direction. This propagation of the stress is required to obtain the first acceleration peak which is high when collision with the head occurs.

Furthermore, the hood outer panel includes the at least one character line at the specified position near the center of the hood where the acceleration is likely to be excessively reduced in the above-described hood structure including the hood inner panel after the first peak when the collision with the head occurs. The character line allows deformation resistance of the hood outer panel to be increased so that bending deformation of the hood inner panel does not occur more than required. In addition, the propagation of the stress in the vehicle front-rear direction can be increased through this character line. Thus, energy produced when the collision with the head occurs can be quickly transmitted in the vehicle front-rear direction, and a region that receives an impact load applied when the collision with the head occurs can be increased. Accordingly, an ideal waveform in which the first acceleration peak is high and quick reduction of the acceleration after the first acceleration peak is suppressed can be easily realized. This allows the amount of absorption of collision energy to be increased and the second acceleration peak to be reduced. Thus, the HIC value can be reduced.

BRIEF DESCRIPTION OF THE DRAWINGS

FIGS. 1A to 1C illustrate a vehicle hood structure according to an embodiment of the present invention, and out of FIGS. 1A to 1C.

FIGS. 5A to 5C illustrate a vehicle hood structure according to a first variant of the present invention, and out of FIGS. 5A to 5C.

FIGS. 6A to 6C illustrate a vehicle hood structure according to a second variant of the present invention, and out of FIGS. 6A to 6C.

FIGS. 7A to 7C illustrate a related-art vehicle hood structure, and out of FIGS. 7A to 7C.

DESCRIPTION OF THE PREFERRED EMBODIMENTS

Figure 1A:
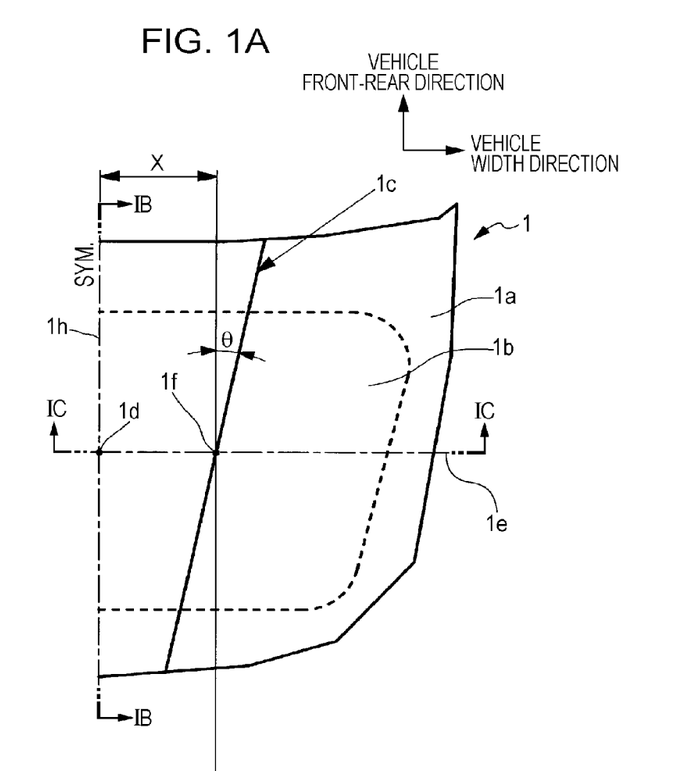
FIG. 1A is a plan view of the vehicle hood structure.
Figure 1B:
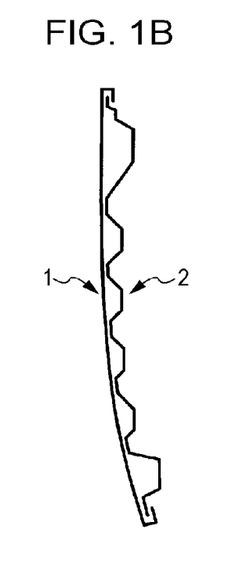
FIG. 1B is a sectional view of the vehicle hood structure illustrated in FIG. 1A taken along line IB-IB illustrated in FIG. 1A.
Figure 1C:
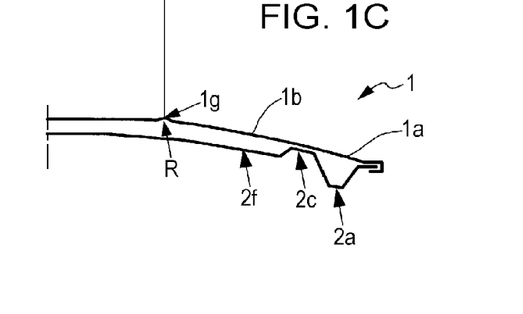
FIG. 1C is a sectional view of the vehicle hood structure illustrated in FIG. 1A taken along line IC-IC illustrated in FIG. 1A.
Figure 2:
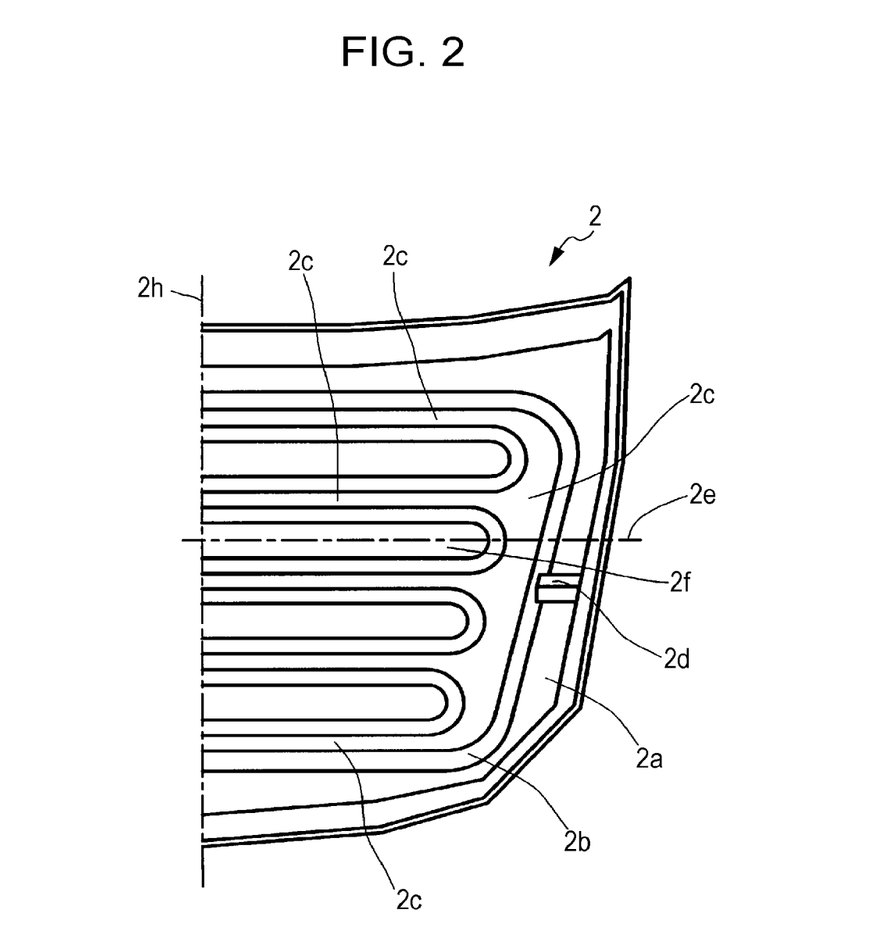
FIG. 2 is a schematic perspective view of a hood inner panel of the vehicle hood structure illustrated in FIG. 1A (with a hood outer panel removed)
Figure 3:
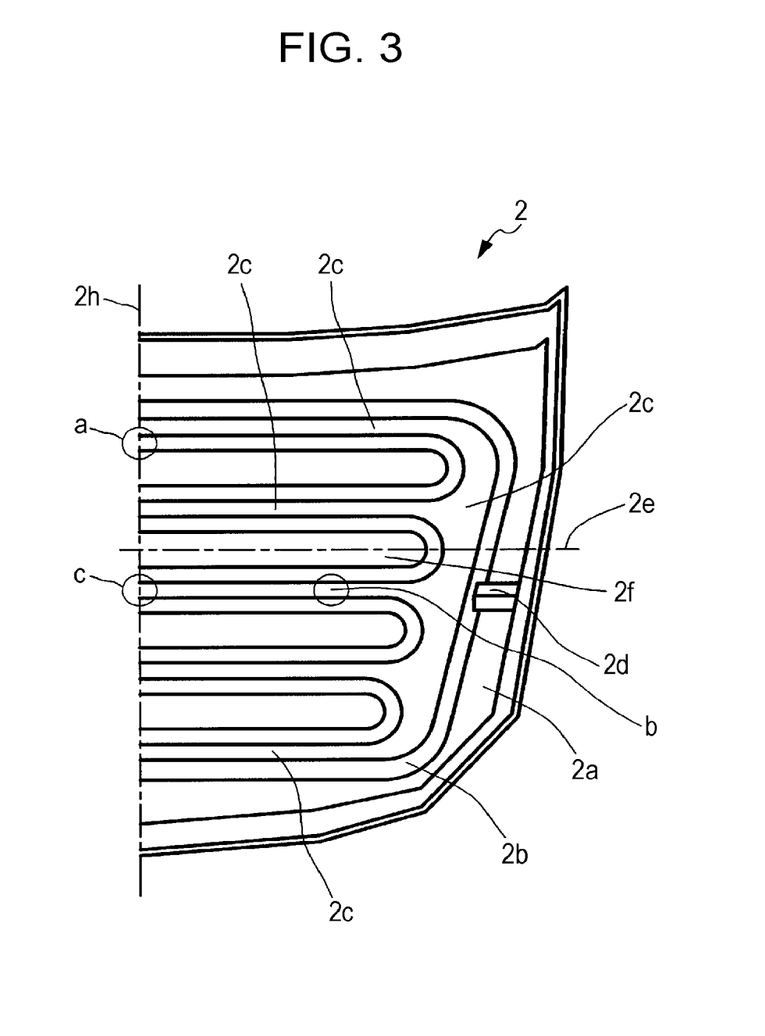
FIG. 3 is an explanatory view of three impact points where impact is applied to the vehicle hood structure, the impact points being indicated on the hood inner panel illustrated in FIG. 2.
Figure 4:
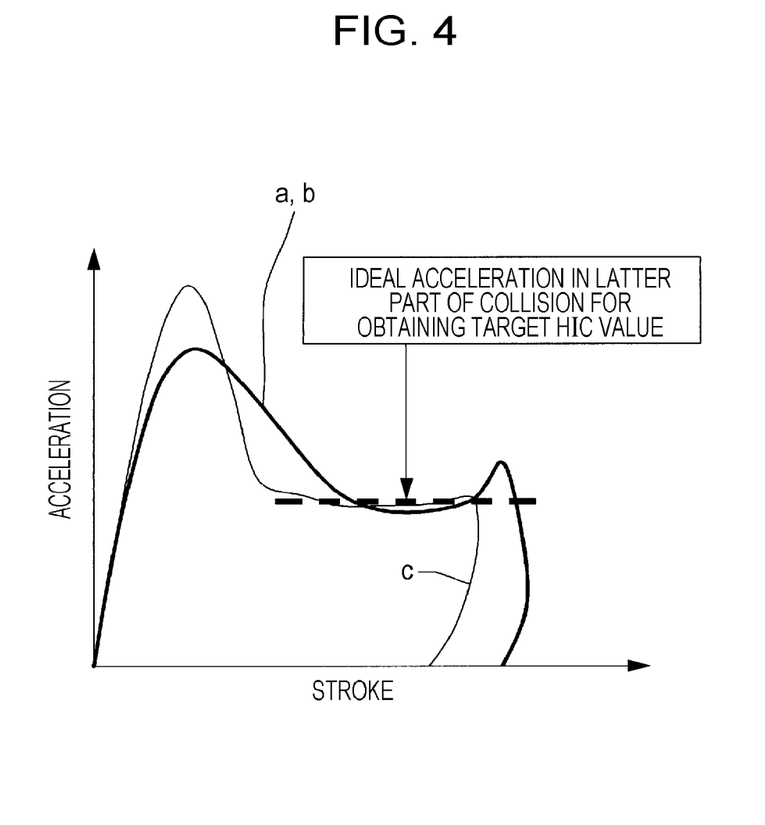
FIG. 4 is a waveform chart illustrating the relationship between a stroke and acceleration at three impact points illustrated in FIG. 3.

The present invention will be described in detail below with an example of an embodiment.
Embodiment FIGS. 1A to 1C illustrate a vehicle hood structure according to an embodiment of the present invention, and out of FIGS. 1A to 1C, FIG. 1A is a plan view of the vehicle hood structure, FIG. 1B is a sectional view of the vehicle hood structure illustrated in FIG. 1A taken along line IB-IB illustrated in FIG. 1A, and FIG. 1C is a sectional view of the vehicle hood structure illustrated in FIG. 1A taken along line IC-IC illustrated in FIG. 1A. FIG. 2 is a schematic perspective view of a hood inner panel of the vehicle hood structure illustrated in FIG. 1A (with a hood outer panel removed). FIG. 3 is an explanatory view of three impact points (may also be referred to as "pedestrian protection performance test points" hereafter) where impact is applied to the vehicle hood structure, the impact points being indicated on the hood inner panel illustrated in FIG. 2. FIG. 4 is a waveform chart illustrating the relationship between a stroke and acceleration at three impact points illustrated in FIG. 3.

Reference numerals in FIGS. 1A to 2 denote as follows: 1 denotes a hood outer panel, 1$a$ denotes an outer peripheral portion of the hood outer panel 1, 1$b$ denotes a central region which is a portion of the hood outer panel 1 except for the outer peripheral portion 1$a$, 1$c$ denotes a character line provided in the hood outer panel 1 so as to extend in the vehicle front-rear direction, 1$d$ denotes a central point where the center of the hood outer panel 1 in the vehicle front-rear direction and the center of the hood outer panel 1 in the vehicle width direction are superposed on each other, 1$e$ denotes a central line that passes through the central point 1$d$, 1$f$ denotes an intersection point where the central line 1$e$ and the character line 1c are superposed on each other, 1g denotes a projecting top portion of the character line 1c, 1h denotes a central line that passes through the central point 1d on the central line 1e and is perpendicular to the central line 1e, 2 denotes a hood inner panel, 2a denotes a bottom surface of the hood inner panel 2 provided in an outer periphery of the hood inner panel 2, 2b denotes a vertical wall that connects the bottom surface 2a and outer peripheries of outer proximal surfaces 2c (to be described later), 2c denotes the outer proximal surfaces disposed at a central portion of the hood inner panel 2 for coupling to the hood outer panel 1 by mastic. Here, the character line 1c refers to a bent line which has a shape having a projecting sectional shape such as a top portion 1g illustrated in FIG. 1C. Furthermore, 2d denotes a crush bead, 2e denotes a central line of the hood inner panel 2 corresponding to the central line 1e in the vehicle up-down direction, 2f denotes a plurality of beads, and 2h denotes a central line of the hood inner panel 2 corresponding to the central line 1h in the vehicle up-down direction. The plurality of beads 2f extend in the vehicle width direction, substantially parallel to one another, and project to the lower side of the vehicle from the outer proximal surfaces 2c on an inner peripheral side of an outer periphery of the substantially annular outer proximal surfaces 2c formed by connecting only the outer proximal surfaces 2c existing in the outermost peripheral portion. Since the vehicle hood structure illustrated in FIG. 1A is symmetric about the central line 1h at the center in the vehicle width direction, FIG. 1A illustrates only a right half of the vehicle hood structure seen from the upper side of the vehicle. Likewise, since the hood inner panel 2 illustrated in FIG. 2 is also symmetric about the central line 2h at the center in the vehicle width direction, FIG. 2 illustrates only a right half of the vehicle hood structure seen from the upper side of the vehicle. As described above, three outer proximal surfaces 2c are provided on the inner peripheral side of the substantially annular outer proximal surfaces 2c (see FIG. 2).

Referring to FIG. 1A, the character line 1c is formed such that the intersection point 1f is positioned within a region extending from the central point 1d by a vehicle-width-direction distance X=150 mm. Thus, since the intersection points 1f are each provided at a corresponding one of positions on the left and right sides of the central point 1d in the vehicle width direction, there are two character lines 1c in the hood outer panel 1. The vehicle-width-direction distance X=150 mm is a distance in the vehicle width direction when the hood outer panel 1 is seen from the upper side of the vehicle (that is, in plan view).

Here, the character lines 1c are each formed substantially in the vehicle front-rear direction. The definition of the term "substantially in the vehicle front-rear direction" is not necessarily limited only to be in a direction in which the character line 1c extends strictly in the vehicle front-rear direction. It is sufficient that the character lines 1c extend generally in the vehicle front-rear direction. For example, an angle θ formed between the character line 1c and a line parallel to the central line 1h is preferably from 0 to 30° and more preferably from 0 to 20°. Furthermore, the character line 1c is not necessarily linear as long as it does not affect the function.

Referring to FIG. 2, the crush bead 2d extends in the vehicle width direction on the bottom surface 2a of the hood inner panel 2. In addition, the hood inner panel 2 is provided with the substantially annular outer proximal surfaces 2c to be coupled to the central region 1b which is the region of the hood outer panel 1 illustrated in FIG. 1A other than the outer peripheral portion 1a. In addition, the hood inner panel 2 is provided with the plurality of beads 2f on the inner peripheral side of the outer periphery of the substantially annular outer proximal surfaces 2c such that the plurality of beads 2f extend in the vehicle width direction, parallel to one another, and project to the lower side of the vehicle from the outer proximal surfaces 2c. With this structure, a first acceleration peak which is high can be obtained when the collision with the head occurs, and stress can be propagated in the vehicle width direction.

That is, according to the present invention, the hood inner panel 2 includes the substantially annular outer proximal surfaces 2c and the plurality of beads 2f extending substantially in the vehicle width direction as illustrated in FIG. 2. Furthermore, the character lines 1c as illustrated in FIG. 1A are provided in the hood outer panel 1 so as to extend substantially in the vehicle front-rear direction in the above-described specified regions.

FIG. 3 is an explanatory view illustrating typical pedestrian protection performance test points (a, b, and c) that are set to explain the characteristics of the vehicle hood structure and are indicated on the hood inner panel 2 illustrated in FIG. 2.

The inventors newly found that, even when the head collides with three pedestrian protection performance test points (a, b, and c) as illustrated in FIG. 3, the relationship between the stroke and the acceleration specific to the present invention is observed (to be described later with reference to FIG. 4) with the vehicle hood structure according to the present invention because of a specific combination of the hood inner panel 2 as illustrated in FIG. 2 and the hood outer panel 1 as illustrated in FIG. 1A. The details will be described below with reference to a specific example.

Example

According to an example, the hood outer panel 1 illustrated in FIG. 1A is provided with the character lines 1c each provided on a corresponding one of the left and right sides. The vehicle-width-direction distance between the intersection point 1f of each of the character lines 1c and the central point 1d is 150 mm and the angle θ relative to the character line 1c is 10°. The hood outer panel 1 is coupled to the hood inner panel 2 illustrated in FIG. 2 by mastic. The radius of curvature R of the projecting top portion 1g of the character line 1c is 8 mm. With the vehicle hood structure having such a structure, when the head collides with three pedestrian protection performance test points (a, b, and c) as illustrated in FIG. 3 as described above, the relationship between the acceleration and the stroke applied to the head of an pedestrian is as illustrated in FIG. 4.

By adopting a structure such as the structure of the present example, when the head collides with a region near the center of the hood outer panel 1, because of the character lines 1c of the hood outer panel 1 disposed at positions comparatively near a collision point, energy produced when the collision with the head occurs can be quickly transmitted in the vehicle front-rear direction through these character lines 1c. At the same time, the energy produced when the collision occurs is also transmitted in the vehicle width direction through the beads 2f of the hood inner panel 2. Thus, collision load can be received by a wide range of the hood outer panel 1. Accordingly, as illustrated in FIG. 4, the first acceleration peak which is high can be obtained even at the pedestrian protection performance test point c set at the center of the hood inner panel 2 where deformation is likely to occur. Furthermore, these character lines 1c become resistant against bending deformation along the beads 2f of the hood outer panel 1. Thus, quick reduction of the acceleration after the first acceleration peak can be suppressed. That is, the first acceleration peak can be increased and the reduction of the acceleration after the first acceleration peak can be suppressed. Thus, the amount of absorption of the energy at an initial stage of the collision can be increased, and a collision stroke can be reduced. Furthermore, an increase in deformation resistance due to the addition of the character lines 1c to the hood outer panel 1 is comparatively small, and accordingly, such acceleration that largely exceeds acceleration with which a target HIC value can be obtained is not caused. Thus, an ideal acceleration waveform can be easily realized.

The vehicle hood structure of the present example includes the hood outer panel 1 and the hood inner panel 2 which are combined with each other. The hood outer panel 1 includes the character lines 1c that extend substantially in the vehicle front-rear direction and have the intersection points if which are each disposed at a corresponding one of the positions on the left and right sides of the central point 1d in the vehicle width direction. The hood inner panel 2 includes the plurality of beads 2f that extend substantially in the vehicle width direction.

It can be recognized that there is no significant difference in the acceleration waveform between the pedestrian protection performance test points a and b illustrated in FIG. 4. Striking points of these pedestrian protection performance test points a and b are at short distances from the bottom surface 2a and the vertical wall 2b included in the hood inner panel 2. In such cases, very large reduction of the acceleration after attainment of first peak in the collision with the head is suppressed by deformation resistance of the vertical wall 2b. Thus, even when an auxiliary effect due to the character lines 1c is not obtained, the amount of absorption of collision energy can be ensured, and accordingly, specified performance can be easily ensured. Conversely, deformation resistance of the character lines 1c is comparatively small compared to that of the vertical wall 2b. Thus, it can be said that, with respect to these striking points in the peripheral portion, setting the character lines 1c in the hood outer panel 1 does not produce significantly adverse effects.

Furthermore, a character line is not effective in the case where the character line is not set in a range in which deformation occurs and the stress propagates when collision with the head occurs. In this regard, the character lines 1c provided at the respective positions on the left and right are set in a range in which deformation occurs and the stress propagates when collision with the head occurs. Thus, the character lines 1c produce a good operational effect. The reason for this is as follows: that is, at a position where the acceleration after the first peak is most largely reduced (that is, corresponding to the position of the pedestrian protection performance test point c), a range in which the stress propagates when the head of the pedestrian collides with the hood outer panel 1 at a speed of about 40 km/h is about 600 mm at the maximum (the above-described intersection points if are separated from the central point 1d by the distance X of about 300 mm or less on the left and right sides of the central point 1d in the vehicle width direction). That is, it has been clarified that, even when the character lines 1c are provided at positions at the distance X of more than 300 mm from a striking point, the collision energy is absorbed before deformation resistance in this portion affects the acceleration to the head, and accordingly, no effect can be obtained. Accordingly, the character lines 1c are preferably set such that the above-described intersection points if are separated from the central point 1d by the distance X of about 300 mm or less on the left and right sides of the central point 1d in the vehicle width direction. It has been verified that, in order to obtain the effect at an early stage after the collision during which the acceleration after the first peak is caused as is the case with the present example, the above-described intersection points if are more preferably separated from the central point 1d by the distance X of 150 mm or less on the left and right sides of the central point 1d in the vehicle width direction. The reason for this is as follows: that is, when two character lines 1c are provided, compared to the case where a single character line is provided in the central portion, which will be described later, resistance against impact load is increased and the region in which the stress propagates toward a surrounding region produced along the character lines 1c is increased. Thus, it is most preferable that the character lines 1c be set such that the distance X is from 100 to 200 mm. The reason for this is as follows: that is, since the propagation of the stress occurring when collision with the head occurs extends along the character lines 1c, the propagation of the stress in the vehicle width direction is unlikely to sufficiently occur when the character lines 1c are excessively close to the center (that is, central line 1h), and the effect on the acceleration waveform is reduced as described above when the character lines 1c are excessively far from the center.

According to the present example, the character lines 1c are provided so that the intersection points if are each disposed at a corresponding one of the positions on the left and right sides of the central point 1d in the vehicle width direction under the conditions in which X=150 mm and θ=10°. However, this is not limiting. That is, as long as the character lines 1c are set in regions so that the above-described intersection points if on the left and right of the central point 1d are separated from the central point 1d by the distance X of 300 mm or less in the vehicle width direction, the operational effect specific to the present invention as described above is produced.

Furthermore, in the case described for the present example, one of the conditions is that the angle θ formed between each of the character lines 1c and the central line 1h is 10°. However, this is not limiting. From the viewpoint of propagating the stress in the vehicle front-rear direction and suppressing bending deformation along the beads 2f of the hood inner panel 2, the angle θ is most preferably set so that the character lines 1c are substantially parallel to the vehicle front-rear direction (the θ is about 0°). Here, the character lines 1c may be slightly inclined relative to the vehicle front-rear direction as long as the character lines 1c generally extend in the vehicle front-rear direction. However, the bending deformation along the character lines 1c is likely to occur when the angle θ exceeds 30°. Thus, the angle θ is at least set to 30° or less, and preferably, set to about 0 to 20°. The character lines 1c are not necessarily linear as long as they do not affect the function. However, the angle θ near the center of the hood where effects on the degradation of performance are significant is more preferably set to 20° or less rather than 0 to 30°.

First Variant

Figure 5A:
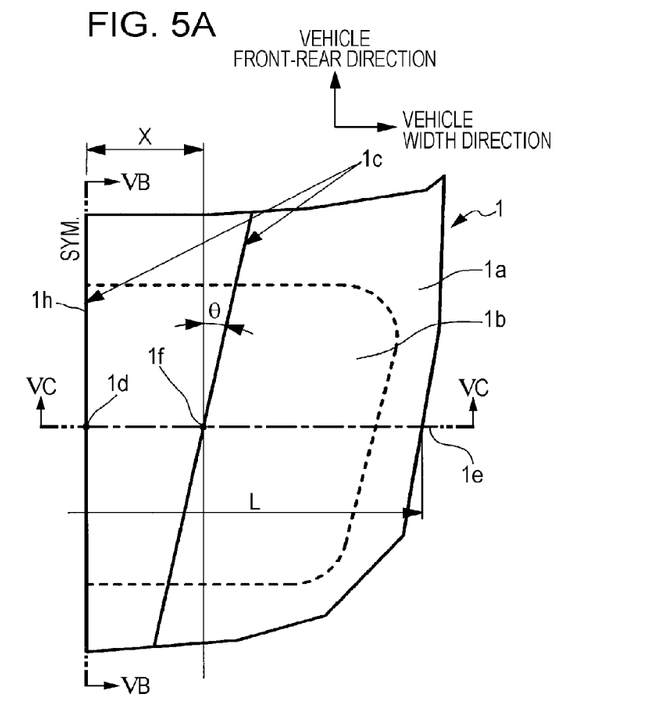
FIG. 5A is a plan view of the vehicle hood structure.
Figure 5B:
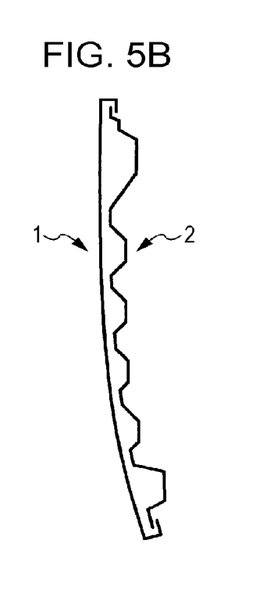
FIG. 5B is a sectional view of the vehicle hood structure illustrated in FIG. 5A taken along line VB-VB illustrated in FIG. 5A.
Figure 5C:
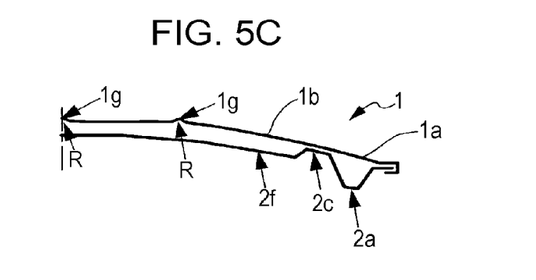
FIG. 5C is a sectional view of the vehicle hood structure illustrated in FIG. 5A taken along line VC-VC illustrated in FIG. 5A.

FIGS. 5A to 5C illustrate a vehicle hood structure according to a first variant of the present invention, and out of FIGS. 5A to 5C, FIG. 5A is a plan view of the vehicle hood structure, FIG. 5B is a sectional view of the vehicle hood structure illustrated in FIG. 5A taken along line VB-VB illustrated in FIG. 5A, and FIG. 5C is a sectional view of the vehicle hood structure illustrated in FIG. 5A taken along line VC-VC illustrated in FIG. 5A. FIGS. 5A to 5C illustrate a structure in which another character line 1c is provided on the central line 1h (that is, disposed such that X=0 mm and θ=0°) of the hood outer panel 1 in addition to the character lines 1c illustrated in FIGS. 1A to 1C. That is, three character lines 1c are provided in the hood outer panel 1. Accordingly, in FIGS. 5A to 5C, the same reference numerals denote the same elements as those illustrated in FIGS. 1A to 1C, and detailed description thereof is omitted.

Since bending deformation is most likely to occur at the position of the central line 1h illustrated in FIG. 5A when collision with the head occurs, from the viewpoint of deformation resistance, it is also preferable that the character line 1c be added at this position. Furthermore, in the case of the structure as described above, a gap between the hood outer panel 1 and the outer proximal surfaces 2c of the hood inner panel 2 is increased by the size of the top portion 1g, which projects in sectional view, of the character line 1c at the position of the central line 1h.

Second Variant

Figure 6A:
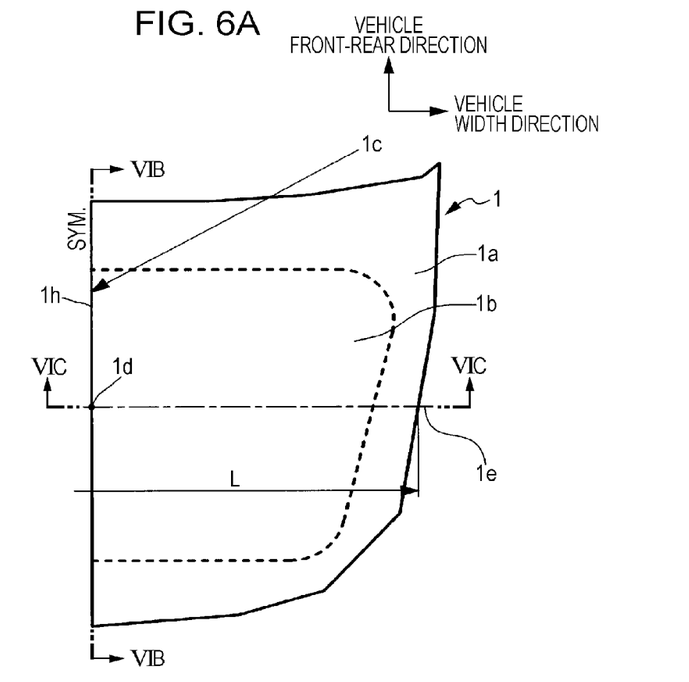
FIG. 6A is a plan view of the vehicle hood structure.
Figure 6B:
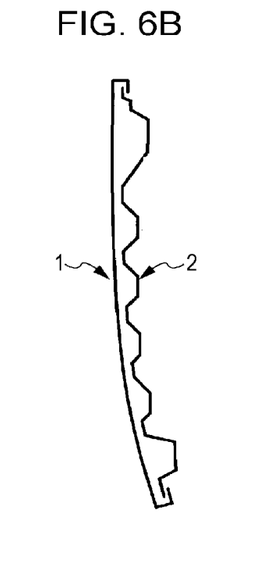
FIG. 6B is a sectional view of the vehicle hood structure illustrated in FIG. 6A taken along line VIB-VIB illustrated in FIG. 6A.
Figure 6C:
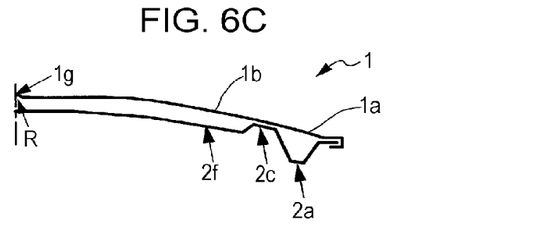
FIG. 6C is a sectional view of the vehicle hood structure illustrated in FIG. 6A taken along line VIC-VIC illustrated in FIG. 6A.

FIGS. 6A to 6C illustrate a vehicle hood structure according to a second variant of the present invention, and out of FIGS. 6A to 6C, FIG. 6A is a plan view of the vehicle hood structure, FIG. 6B is a sectional view of the vehicle hood structure illustrated in FIG. 6A taken along line VIB-VIB illustrated in FIG. 6A, and FIG. 6C is a sectional view of the vehicle hood structure illustrated in FIG. 6A taken along line VIC-VIC illustrated in FIG. 6A. FIGS. 6A to 6C illustrate a structure in which, out of three characters lines 1c illustrated in FIGS. 5A to 5C, only the character line 1c on the central line 1h (that is, disposed such that X=0 mm and θ=0°) of the hood outer panel 1 is provided. Accordingly, in FIGS. 6A to 6C, the same reference numerals denote the same elements as those illustrated in FIGS. 5A to 5C, and detailed description thereof is omitted.

Even in the case where the character line 1c is provided only on the central line 1b as described above, the following required features of the present invention are satisfied: that is, the hood outer panel 1 includes at least one character line 1c that extends substantially in the vehicle front-rear direction, and the intersection point 1f (superposed on the central point 1d in the case of the present second variant) is separated from the central point 1d by the vehicle-width-direction distance X of 300 mm or less. Thus, the following operational effect specific to the present invention is produced: that is, the vehicle hood stably undergoes bending deformation when a front collision with a vehicle occurs, and the pedestrian protection performance can be further improved.

There have been known techniques in which a character line is provided in a hood outer panel. However, the related-art character line is determined for a good appearance of a vehicle. Thus, the object of the related-art character line is different from the above-described object of the present invention. Furthermore, the position of the related-art character line provided in the hood outer panel is different from the specific position disclose in the above-described structure of the present invention. In addition, the relationship with the hood inner panel, which is, of course, the precondition, is not discussed.

Although the radius of curvature R of the projecting top portions 1g of the character lines 1c is 8 mm according to the present example and the first and second variants, this is not limiting. It is sufficient that the radius of curvature R of the top portions 1g be 5 mm or more from the viewpoint of production engineering. The reason for this is as follows: that is, in the case where the radius of curvature R is less than 5 mm, this may frequently lead to so-called line deviation, which is inaccuracy in a surface shape, in a damaged portion of the character line 1c when pressing particularly an aluminum sheet, which is desirable from the viewpoint of weight reduction. Particularly in the case of a hood outer panel formed of aluminum, the local elongation of which is smaller than that of a steel sheet, the line deviation is likely to occur. In order to address this, it is desirable that the radius of curvature R of the top portions 1g be increased as much as possible. Thus, the radius of curvature R of the top portions 1g is preferably 5 mm or more. However, when the radius of curvature R of the projecting top portions 1g is increased, the effects of propagating the stress and suppressing the bending deformation produced by the character lines 1c when the collision with the head occurs are reduced. Particularly, when the radius of curvature R exceeds 20 mm, the effect, of suppressing the bending deformation produced by the character lines 1c is very largely reduced. Thus, the radius of curvature R of the projecting top portions 1g is preferably set to from 5 to 20 mm.

Also, in order to provide the raw material itself with the pedestrian head protection performance and formability that satisfies the formation of the hood outer panel, it is preferable that the hood outer panel be formed of a 6000 series Al—Mg—Si based aluminum alloy sheet specified by the Aluminum Association (AA) or Japanese Industrial Standards (JIS). After the 6000 series aluminum alloy sheet has been formed into the hood outer panel, as a characteristic after artificial aging hardening treatment has been performed at 170° C. for 20 minutes following the application of a 2% prestain, a 0.2% yield strength is preferably 80 to 225 MPa on the assumption that the hood outer panel is used for the vehicle body after the hood outer panel has undergone paint-bake hardening treatment.

In the case where the 6000 series aluminum alloy sheet as described above is used, the sheet thickness t of the hood outer panel is preferably about 0.6 to 1.2 mm for obtaining the above-described performance.

Furthermore, although the plurality of beads 2f extend in the vehicle width direction, substantially parallel to one another, and linearly shaped according to the present example and the first and second variants, this is not limiting. For example, the plurality of beads 2f may have curvatures in accordance with a layout, may extend in a slightly inclined direction, or may be diverted from midway portions.

What is claimed is:

1. A vehicle hood structure that includes a hood inner panel and a hood outer panel,
wherein the hood inner panel includes
a substantially annular outer proximal surface coupled to a central region of the hood outer panel which is a region of the hood outer panel other than an outer peripheral portion of the hood outer panel, and
a plurality of beads that are disposed on an inner peripheral side of the substantially annular outer proximal surface, that extend in a vehicle width direction, that are substantially parallel to one another, and that project from the outer proximal surface to a lower side of a vehicle,
wherein the hood outer panel includes
at least one character line that extends substantially in a vehicle front-rear direction, and
wherein the at least one character line intersects a central line that extends in the vehicle width direction and that passes through a central point where a center of the hood outer panel in the vehicle front-rear direction and a center of the hood outer panel in the vehicle width direction are superposed on each other, and wherein the at least one character line intersects the central line at an intersection point positioned within a region extending from the central point by 300 mm or less in the vehicle width direction.

2. The vehicle hood structure according to claim 1, wherein the at least one character line includes a plurality of character lines, wherein the plurality of character lines are provided on a left and right sides of the central point in the vehicle width direction so as to be symmetric about the central point, and wherein the plurality of character lines are substantially parallel to the vehicle front-rear direction.

3. The vehicle hood structure according to claim 1, wherein, in a section of the hood outer panel taken along the central line, a radius of curvature of a top portion of the at least one character line projecting to an upper side of the vehicle is from 5 to 20 mm.

4. The vehicle hood structure according to claim 2, wherein, in a section of the hood outer panel taken along the central line, a radius of curvature of a top portion of each of the plurality of character lines projecting to an upper side of the vehicle is from 5 to 20 mm.

* * * * *